Nov. 12, 1963 S. R. HUBBARD 3,110,503
JOINT FOR PRESTRESSED CONCRETE PIPE
Filed March 27, 1961 2 Sheets-Sheet 1
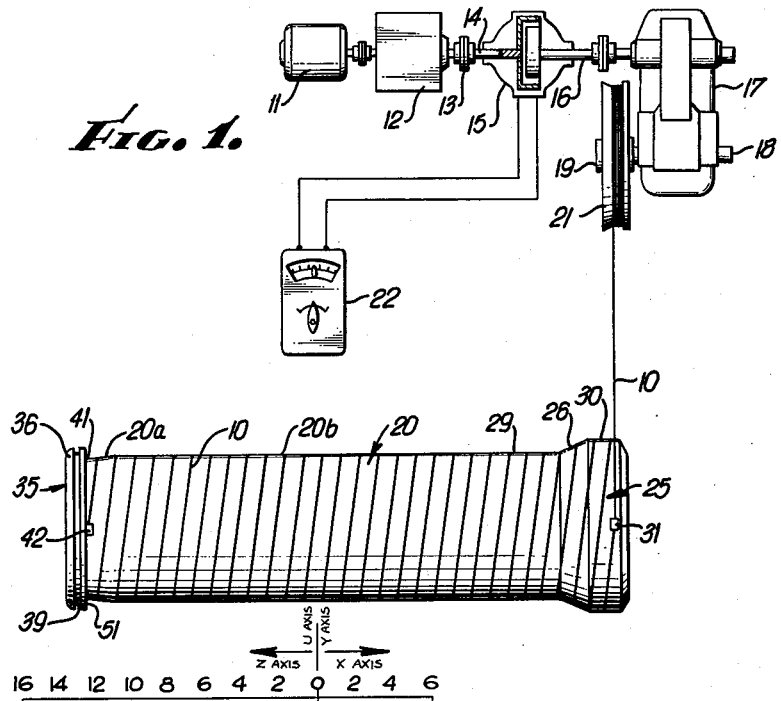
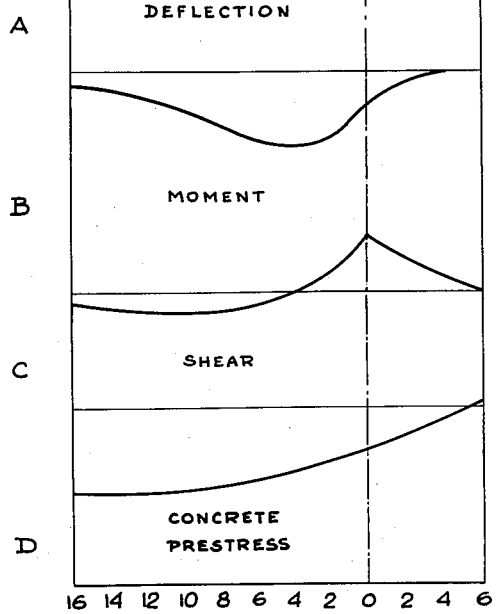
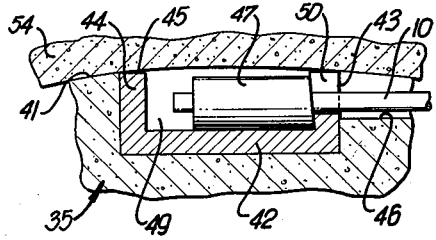
INVENTOR.
STEPHEN R. HUBBARD
BY
Beehler & Shanahan
ATTORNEYS.

Nov. 12, 1963   S. R. HUBBARD   3,110,503
JOINT FOR PRESTRESSED CONCRETE PIPE
Filed March 27, 1961   2 Sheets-Sheet 2
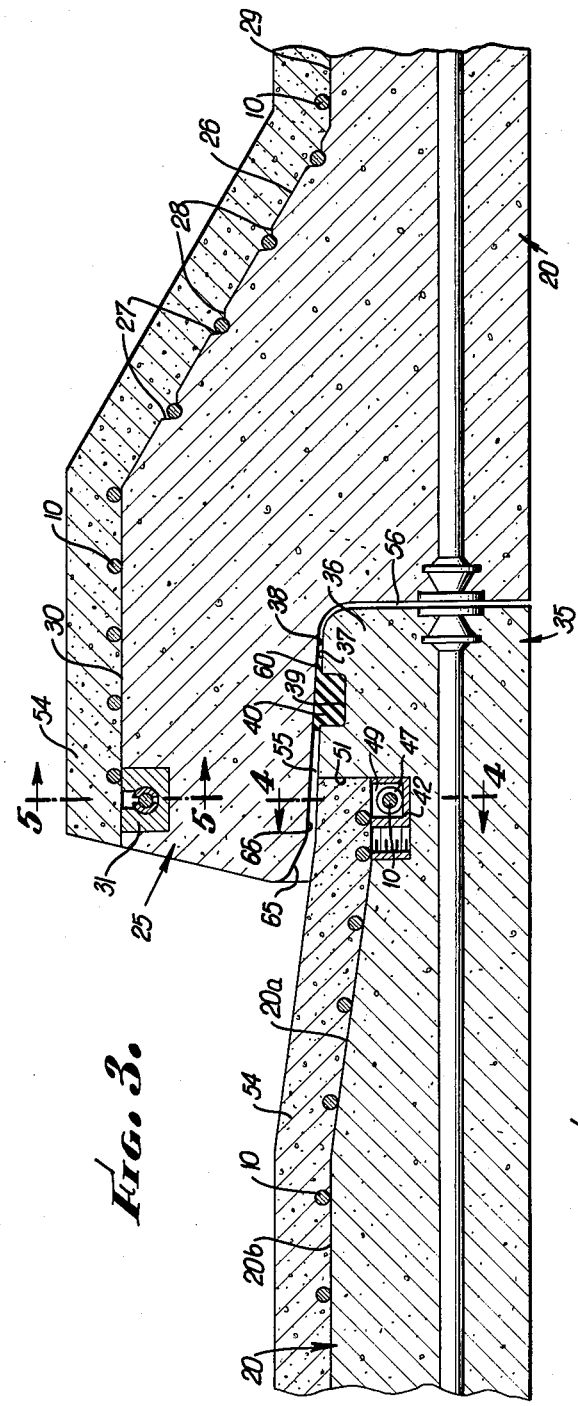
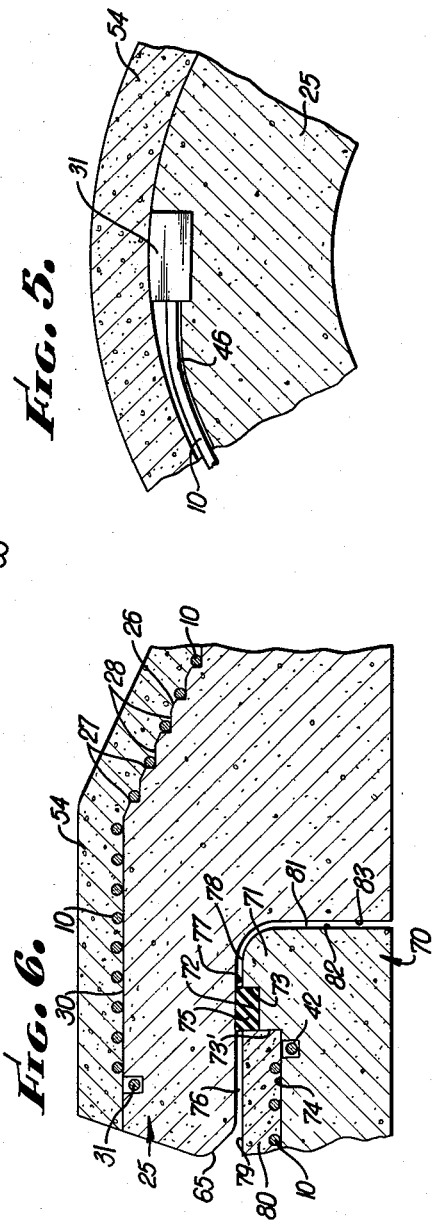
INVENTOR.
STEPHEN R. HUBBARD
BY
Beehler & Shanahan
ATTORNEYS.

3,110,503
JOINT FOR PRESTRESSED CONCRETE PIPE
Stephen R. Hubbard, 5224 Kent Drive, Bakersfield, Calif.
Filed Mar. 27, 1961, Ser. No. 98,554
4 Claims. (Cl. 277—237)

The invention relates to the art of manufacturing prestressed concrete pipes and has particular reference to a practical and effective joint for prestressed concrete pipe which carries the full strength of the pipe through the joint and includes the winding of wire under tension to locations adjacent the ends of the pipe where it is fastened and covered. This is a continuation-in-part of copending application Serial No. 696,760, filed November 15, 1957, and now abandoned.

Subsequent to the introduction of molded reinforced concrete pipe to the industry, attention began to focus upon technique for still further strengthening the molded pipe. It was discovered that molded concrete pipe, though not ordinarily strong enough to support high internal pressures, could be strengthened to a very desirable degree by wrapping the exterior of the pipe with a helical coil of wire under tension. For certain practical reasons it is desirable to cover the stressed wire with an additional layer of mortar or grout in order to protect it from the elements.

Pipe wound with wire in the manner above described is identified as prestressed pipe. There are two types of prestressed pipe commonly in use throughout the world. One is a pipe constructed by lining a steel cylinder with concrete, then subsequently wrapping the steel cylinder with high tensile wire in the manner described above. The wire and cylinder are then coated with mortar. This type of pipe is called steel cylinder concrete pipe prestressed.

A second type of pipe commonly in use is made by simply wrapping a concrete core with high tensile wire in such a way that the concrete will always be subject to compressive stresses. This type of pipe is commonly referred to as non-steel cylinder prestressed pipe, and is progressively supplanting the steel cylinder type.

Steel cylinder pipe prestressed has several disadvantages. First, the pipe is made with metal end rings, which are subject to corrosion from ground water and water from within the pipe. Second, the high tensile wire wrapped around the cylinder for prestressing is generally welded to the cylinder or end rings. This type of construction results in a situation where two dissimilar metals are in contact and electrolytic action, due to current flow between the two, can and does ensue. The action causes stress corrosion in the wrapping wire. Third, the cost of the steel cylinder and metal joint rings is much greater than that of plain concrete core.

In non-steel cylinder type concrete pipe prestressed, it can be shown that if the wrapping wire is terminated a distance of six inches, more or less, from the spigot end of the pipe, a discontinuity stress will result. If the wire is terminated too far from the spigot end of the pipe, the resulting discontinuity stress will exceed the flexural stress of the concrete and ring cracks within the pipe will occur at the point of maximum bending moment. This results in leakage. In order to counteract these stresses, it has been common practice to induce longitudinal prestressing in the pipe core before it is wound. When the pipe core is longitudinally prestressed, axial stresses, which counteract discontinuity stress, are set up. Longitudinal prestressing is an adequate solution to the problem of discontinuity stresses. It is, however, cumbersome and expensive. It can be shown by calculation and actual tests, well understood by those skilled in the art, that discontinuity stresses can be kept at values below safe working values for the concrete if the wrapping of the pipe core is extended sufficiently close to the spigot end.

This gives rise to the problem of designing a joint in which the wire may be wound very close to the spigot end of the pipe, while yet maintaining an adequate and serviceable joint seal. It has been demonstrated by applicant to the industry that a round rubber gasket type of sealing element is the most efficient for this type of work. In order to wind wire close to the spigot end of the pipe, attempts have been made to place a mortar coating over wire wound close to the spigot end and then to place a groove in the mortar to receive the rubber gasket sealing element. It has been discovered, however, that with this type of joint water under pressure from within the pipe tends to infiltrate between the mortar and the pipe core, finally reaching the stressing wire and subjecting it to corrosion.

Recent studies in connection with the performance of prestressed concrete pipes has revealed that, for example, on occasions where the stressed wire is given a circumferential stress to create a prestress in the concrete of something in the neighborhood of 2000 pounds per square inch, the ends of the wires are usually terminated at a distance of about six inches from the end of the pipe. The remaining six inch length of pipe length which remains non-prestressed is reserved for the construction of the joint. Although heavy metal rings on occasions have been suggested for improving the effectiveness of the joint, these have had numerous and serious disadvantages among which is corrosion and the expensiveness of structure of this kind. Other expedients have also been tried, as, for example, providing a recess between the last turn of the prestressed wire at the spigot pipe end and winding numerous turns of wire of small diameter in the recess, after which the recess is packed solid with some form of cement or plastic. This wire in the recess is, however, discontinuous with the prestress wire and sets up new conflicting strains which destroy the intended effect.

Though many such disadvantages can be eliminated by use of an all concrete joint structure, reported tests in connection with certain joints of the last described types have indicated that the elastic and plastic deformations caused by the prestress in the pipe wall will be counteracted by the non-prestressed ends, thus creating secondary bending moments and shearing stresses which become more critical as the prestress and diameter of the pipe increase. Pre-tension spiral winding creates deformations in the pipe wall not only beneath the prestressed wire but also in the adjacent non-prestressed portion and the tendency has been noted as the result of testing to be a flaring outward of the end of the pipe at both the non-prestressed portion and the adjacent prestressed portion. Stresses thus created may be sufficient to cause ring cracks in the concrete core.

Moreover, where joints have been solidly packed in an attempt to make up in packing for the prestress strength which lack of winding exhibits, the solidly packed joints create a rigidity which is harmful. Unavoidable flexure of such rigid joints in actual use springs the joints and as a result the theoretical advantage is habitually destroyed and lost. Solid metal ring joints where they have been restorted to in an attempt to solve the problems are so subject to rust and corrosion that they have been found extremely impractical and unusable for many of the most common types of pipe service.

It is, therefore, among the objects of the invention to provide a new and improved reinforced concrete pipe structure and joint therefor which is substantially stronger especially at the ends of the pipe than those heretofore employed.

Another object of the invention is to provide a new and improved prestressed concrete pipe structure which is so formed at the ends and particularly at the spigot end that tendency of moisture to infiltrate the area where the prestressed reinforcement is bonded is eliminated.

Still another object of the invention is to provide a new and improved prestressed concrete pipe structure particularly as related to the ends of the pipe wherein special attention is given to the location and manner of fastening the end of the prestressed reinforcing wire, thereby to not only protect it for the period of its use but also to avoid any prospect of electrolysis which might be created by metal to metal contact of dissimilar metals.

An object further of the invention is to provide a new and improved joint for prestressed pipe which is flexible and contains a pre-established clearance entirely around the pipe, the flexible portion of the joint being rugged.

Still further among the objects of the invention is to produce a new and improved prestressed concrete pipe joint structure which is capable of being fabricated and made up in a simple direct fashion, thereby avoiding any additional cost and which at the same time forms a more dependable joint both from the point of view of initial strength and progressive deterioration.

Another object also is to provide a new and improved all concrete pipe joint wherein neither bell nor spigot elements include a metal reinforcing sleeve of any kind and wherein no joints are exposed to the presence of fluid passing through the pipes.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

FIGURE 1 is a diagrammatic view of a prestressing machine by means of which reinforcing wire under tension is applied to a molded concrete pipe core.

FIGURE 2 is a table graphically portraying stress conditions present at the end of a prestressed concrete pipe of conventional construction and indicating the area wherein additional strengthening is requisite.

FIGURE 3 is a fragmentary longitudinal, sectional view of one form of made-up pipe joint employing the structure of the invention.

FIGURE 4 is a fragmentary cross-sectional view taken on the line 4—4 of FIGURE 3.

FIGURE 5 is a fragmentary cross-sectional view taken on the line 5—5 of FIGURE 3.

FIGURE 6 is a fragmentary longitudinal sectional view of another form of joint.

As will be noted from an examination of FIGURE 2 at the portion indicated by the reference character A, the deflection existing at the spigot end of a conventional prestressed concrete pipe, wherein the prestressing reinforcing wire is anchored six inches from the end, is shown to extend from the free end progressively toward the other end of the pipe and for a distance of six to eight inches over that portion of the pipe which is in fact prestressed. In the graph marked B the bending moment is shown as being at its maximum about four inches within the prestressed portion or about ten inches from the free end. In the graph indicated by the reference character C the maximum shear exists at the area where the reinforcing wire is anchored. The graph indicated by the reference character D shows concrete prestress to extend progressively from a location about sixteen inches from the anchored end of the prestressed reinforcing wire diminishing toward the free end to slightly less than zero at the free end. The prestress, as noted from the curve, diminishes rapidly from the area where the prestress reinforcing wire is anchored. Curves plotted in FIGURE 2 depend on wire spacing and the amount of tension applied. The values indicated are illustrative only of a typical condition and may vary considerably under different conditions.

In an embodiment of the invention chosen for the purpose of illustration and constructed to improve the conditions illustrated in FIGURE 2, there is shown a prestressing machine including features capable of producing a prestressed concrete pipe of the type herein disclosed. While comprehensive details of a machine of the type herein made reference to are fully described in Patent No. 2,822,989, certain pertinent portions of the structure are illustrated herein in the interest of providing a comprehensive disclosure.

For example, in order to maintain tension upon a reinforcing wire 10 a motor 11 is provided. The motor 11 acting through a gear reducer 12 connected to a coupling 13 and shaft 14 actuates a dynamatic clutch 15. Attached to the dynamatic clutch is a driven shaft 16 connected to a gear reducer 17. The gear reducer is coupled with a shaft 18 on which is a capstan 19. The reinforcing wire 10 which is to be wound upon a blank 20 is fed to the capstan over a reel 21. An electric control 22 is adapted to be manipulated in order to determine the tension to be applied to the wire 10.

In operation the motor 11 rotates in a direction contrary to the direction of progress of the wire 10 as it is taken up by the blank. Inasmuch as the dynamatic clutch 15 is a slip clutch, the shaft 14, while rotating in the direction driven by the motor, is opposed to rotation of the shaft 16 in a contrary direction caused by the pull upon the wire exerted by rotation of the blank. The tension will be kept constant by the setting of the dynamatic clutch. In the event rotation of the blank stops as it will at the end of the winding, tension will be maintained as long as the motor 11 continues to rotate. Hence there is maintained in the reinforcing wire all of the needed tension until it is securely anchored in place.

In making molded concrete pipes it is expedient to form a bell 25 with a reasonably steep exterior slope 26, as shown in FIGURES 1, 3 and 6. A properly prestressed pipe should have the prestressing wire wound about the slope of the bell. This construction is made possible in applicant's structure by casting in the exterior surface of the sloping portion of the bell a helical recess 27 having a flat land 28 for reception of the wire 10. As shown the sloping rear face 26 extends from a cylindrical surface 29 of the main portion of the blank to a cylindrical portion 30 of the bell.

Various conventional means may be employed to form the helical stepped portion, as illustrated in FIGURES 3 and 6. As the wire is wound it will be maintained under tension during the climbing of the slope 26 and thereafter.

During the pouring of the mold (not shown), an anchor lug or clamp 31 is also cast in place. During the molding process the anchor can be secured in proper position by appropriate bolts (not shown) which are removed subsequent to the casting operation immediately prior to removal of the mold from the cast blank.

The structure described is productive of an open circuit from the point of view of electrolysis action in applicant's device. This avoids the objectionable condition prevalent in the prior art where, by connecting the prestressing wire to a metal liner of different metallic character, an electrolytic action invariably results.

Of special consequence is the construction of a spigot end 35 of the blank 20, a longitudinal sectional view of which is shown in FIGURE 3. By appropriate molds there is formed at the spigot end a flange 36 of the originally poured or parent concrete. This flange has an outermost surface 37 of such diameter that it comfortably clears an interior surface 38 of the bell 25 of the next adjacent pipe which may be brought into place for the purpose of making a joint. Immediately adjacent the flange 36 is an annular recess 39 having a depth and breadth suited to the reception of an appropriate relatively soft seal ring 40. In the form of invention of FIGURE 3 the circumference of the bottom of the recess 39 is slightly greater than the exterior circumference of a cylindrical surface 41.

An anchor lug or clamp 42, similar to the anchor 31, is embedded in the parent concrete during the molding in the same fashion. The anchor lug has ends 43 and 44 which in the finished blank lie below the cylindrical surface 41. The outer surface 45 of the anchor lies substantially flush with the cylindrical surface. A suitable oblique groove 46 is usually cast in the blank for reception of the wire adjacent the anchor. During the forming of the spigot end and after removal of the mold, a sleeve 47 is clamped to the wire 10. The sleeve has a bore therethrough lined with an appropriate porcelain lining of an extremely frangible character. For anchoring the wire 10 to the sleeve the wire is inserted through the bore and the sleeve is then crushed by mechanical means, shattering the porcelain which then serves to prevent withdrawal of the wire induced by the tensile pull present in the reinforcing wire. After being clamped on the wire, the sleeve is inserted into an opening 49 in the anchor so that the wire passes through a slot 50 in the end 43 thereby to anchor the wire to the anchor.

In this connection it is important to note that the anchor lug is very close to a shoulder 51, in fact as close to the shoulder as will permit insertion of the wire into the sleeve.

After application of the reinforcing wire and after it has been anchored in place under tension by use of the machine heretofore described, a coating 54 of grout or mortar, having an external diameter throughout most of the pipe length greater than the diameter of the flange 37, is applied. The coating completely covers all of the exterior of the blank over which the reinforcing wire has been wound and extends over the anchor lug up to a point flush with the shoulder 51.

As indicated the anchor lug or clamp 31 makes possible winding of the reinforcing wire 10 over the cylindrical portion 30 of the bell to a point near the outermost end of the bell. Wound as shown and described, the final turn of the wire at the spigot end will almost be in alignment with the outermost turn of the wire at the bell end, depending upon how closely the turns are spaced. Also, and even more significant, is the fact that the final turn of the wire at the spigot end will lie within the inner surface of the bell end and consequently within the joint. Significantly, also the space between the final turn of the wire at the spigot end will be spaced from the transverse center line of the seal ring 40 a distance not greater than about the spacing of loops of the wire on the blank. The final loops at the bell end actually overlie the seal ring. For pipes of average size from one and one-half feet in diameter to five feet in diameter, the breadth of the flange does not exceed three and one-half inches for the larger sizes and three inches for the smaller sizes. Thus the prestress winding of the pipe of the invention at the spigot end is twice as near the end as any winding heretofore employed. This makes possible use of a seal ring recess and seal ring about ⅞ inch to 1 1/16 inches wide leaving a breadth of flange nearest the end from 1 inch to 1 1/16 inches wide, depending on the pipe size, and a flange breadth on the opposite side of about ¾ inch. The seal ring 40 is therefore contained throughout a major portion of its depth in the recess and protrudes outwardly an initial distance of about ⅛ inch.

Further, still in this form of the invention there is a sloping portion 20a on the exterior of the blank which can be about five degrees extending from a cylindrical surface 41 outwardly and the cylindrical area 20b. This permits substantially the entire length of the blank to be slightly greater in outside diameter than the part immediately adjacent the flange were, if need be, closer spacing of the wire can be employed as shown to assure adequate prestressed strength.

By bringing the turns of reinforcing wire at the spigot end as far within the joint as shown and described, the deflection, moment, shear and prestress factors shown graphically in FIGURE 2 are improved to a very material degree. The effect of the prestress, of course, carries axially an appreciable distance beyond the center line of the wire of the loop. The deflection will be reduced considerably so that there is only a slight deflection at the zero point which in the new construction will be about two inches from the end of the blank. Moment at its maximum will be brought to appreciably less than the six-inch length which will be within the pipe joint. Shear at its maximum will also lie within the joint and the prestress curve will be greatly flattened. Consequently in a joint made up of parts fabricated as shown and described, the joint will be so materially strengthened as to make a greatly improved practical structure.

Another and valuable factor present in the structure defined lies in the presence of the seal ring 40, or gasket as it is frequently termed, providing a block or seal against passage of liquid within the pipe to a joint 55 which lies between the coating 54 and the parent concrete of the blank. Fluid, and particularly water, which might find its way through a passage 56 will be blocked by the seal ring or gasket. Hence, regardless of its pressure and even in the instance of very high pressure, there will be no tendency for moisture to be forced along the joint 55 where, if it should penetrate, it would deteriorate the bond between the wire and the coating 54 and possibly ultimately release the prestress in the wire and for that reason cause failure of the pipe line.

It is readily seen by use of the proposed structure that the flange 37 is part of the parent concrete, thus providing a water stop or a discontinuance of the joint 55, some distance back from passage 56 which could not be the case if the flange were formed of the same material as the cover coat. Therefore, there is no seam along which water in passage 56 can penetrate and reach the prestressing wire.

A further and equally important factor designed into the joint herein disclosed resides in the presence of a clearance 60 existing between the exterior surface 37 of the flange 36 at the spigot end within the joint and the interior surface 38 of the bell end. Practice indicates that this clearance for the most common pipe sizes can be about 1/32 inch on all sides. The dimension can be accurately controlled in the molding of the pipe and the presence of a seal ring 40 of uniform and acceptable characteristics can be depended upon to maintain this clearance, which may, however, be varied somewhat within reasonable limits. Moreover, providing a flare 65 of something in the neighborhood of thirty degrees at the entrance of the bell end opening terminating in a flare 66 of from about one degree to two degrees at the interior of the bell, the making up of the joint when the spigot end and its seal ring are inserted therein is greatly facilitated. The making of the joint and its ultimate performance is substantially assured by employment of a seal ring of natural or synthetic rubber having a tensile strength of from 1750 to 3000 p.s.i., a compression set of not greater than about twenty percent and a density of approximately sixty to seventy pounds per cubic foot.

In a form of the device illustrated in FIGURE 6 a spigot end 70 is formed with a flange 71 in which is incorporated a step 72 lying between a face 73 of the flange and a shoulder 73'. In this form shoulder 73' is perpendicular to the axis of the blank and joins an outer cylindrical exterior 74 of the blank. In this instance, the step comprises an annular recess. The recess is carried well within the bell opening to bring a seal ring or gasket 75 to a location overlapped by several turns of the wire 10 on the exterior of the bell 25. In this instance the anchor 42 for the reinforcing wire 10 may be moved still further into the interior of the bell cavity when the pipe joint is made up, thereby improving the character of the joint with respect to deflection moment, shear and prestress over and above the improvement made reference to in connection with the first described form.

As in the first described form a clearance 76 is preserved between the interior wall 77 of the bell and an exterior surface 78 of the flange and exterior surface 79 of a protective coating 80 which may, if preferred, have an exterior diameter slightly larger than the diameter of the surface 78. Similarly, a space 81 is preserved between an end 82 of the spigot and shoulder 83 at the inside of the bell. A flare 65 serves as an entrance guide for the bell when the joint is assembled. The seal ring 75 serves in the same fashion as the seal ring 40 in preventing moisture from reaching the prestress wire from the interior of the pipe and also preserves flexibility in a tightly sealed joint. Seated in the recess, the recess prevents the seal ring from being displaced when the joint is made up.

To be certain of the performance of the joint herein described wherein the reinforcing wire is anchored close to the end of the spigot pipe end, the wire must be capable of application to the blank under a selected degree of tension. Obviously when the tension is applied, the anchor lug at the spigot end, if that be the starting end, must have a tenacious grip on the wire and the grip must be one capable of being made as snug as shown with respect to the flange at the spigot end. Thereafter the wire is applied as close as desired with respect to the helical turns and after climbing the outside surface of the bell must be capable of being held under tension until the opposite end is firmly and securely anchored. Thereafter the coating is supplied and there should be no shift or displacement of the wire or coating experienced once the coating has set up in place. The coated prestressed pipe lengths are then ready for laying by use of the improved joint structure herein described and claimed.

So constructed and made up, the joint can flex without leaking and requires no adhesives, compounds, or caulking of any kind. The joint is likewise one which permits expansion and contraction to a degree not heretofore experienced.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described the invention, what is claimed as new in support of Letters Patent is:

1. A bell and spigot joint for prestressed molded concrete pipes comprising a bell at the end of one pipe and a spigot at the adjacent end of an adjoining pipe, said one pipe comprising a molded concrete core including said bell, said bell having a substantially cylindrical interior wall comprising a sealing surface, a shoulder at the bottom of the cylindrical interior wall, a prestressed continuous helical coil of wire extending throughout the exterior of the core of said one pipe and the bell thereon, an anchor embedded in the outer end of the bell secured to said wire, an anchor for said wire embedded in the opposite extremity of said one pipe, and a protecting layer of plastic material covering said wire, said anchors and the core surface, said adjoining pipe comprising a molded concrete core including said spigot, said spigot comprising an annular flange having an axial breadth substantially less than the axial depth of said cylindrical interior wall and having a diameter less than the diameter of said cylindrical interior wall of said one pipe, said flange having a continuous outer surface of the material forming said last core, a substantially cylindrical exterior surface on said last core, a prestressed helical coil of wire on said cylindrical exterior surface, an anchor for the wire immediately adjacent said flange, an anchor for the other end of said wire at the opposite extremity of the last core, a protecting layer of plastic material covering said last identified wire and anchors therefor and said last core, said protecting layer having an exterior diameter adjacent the flange less than the diameter of said cylindrical interior wall of the bell and providing a clearance between said bell in the finished joint, means forming a step in the outside edge of said flange adjacent the respective cylindrical exterior surface, said step having fore and aft radial faces and an annular seal ring of resilient material in said step having a side surface in sealing engagement with each of said radial faces and a perimeter protruding beyond the perimeter of the flange into a flexible sealing engagement with said cylindrical interior wall, said spigot having a position within the bell wherein said flange is adjacent said shoulder and spaced a substantial distance inwardly from the outer end of the bell, a plurality of loops of said last coil of wire having a location within said cylindrical interior wall and within the wire on said bell, whereby to provide an overlap of loops of prestressed wires respectively of the bell and spigot ends forming the resilient joint and whereby axial compression of said seal ring by fluid within the conduit forces said seal ring against the radial face which is outward relative to the direction of pressure to prevent seepage of liquid to the reinforcing wire and to prevent extrusion of the seal ring.

2. A bell and spigot joint according to claim 1 wherein the aft radial face of the step is formed by the adjacent protecting layer.

3. A bell and spigot joint according to claim 1 wherein the aft radial face of the step is formed by a portion of the material of core from which the flange extends.

4. A bell and spigot joint according to claim 1 wherein the exterior diameter of the flange is substantially the same as the exterior diameter of the core from which the flange extends and a portion of said last core slopes radially inwardly to a location adjoining the flange whereby to form a depression for reception of said protecting layer.

References Cited in the file of this patent

UNITED STATES PATENTS

| | | |
|---|---|---|
| 1,357,311 | Buente | Nov. 2, 1920 |
| 2,571,578 | Van Der Maelen | Oct. 16, 1951 |
| 2,706,498 | Upson | Apr. 19, 1955 |
| 2,805,683 | Kennison | Sept. 10, 1957 |
| 3,034,536 | Kennison | May 15, 1962 |

FOREIGN PATENTS

| | | |
|---|---|---|
| 132,905 | Australia | May 30, 1949 |
| 914,695 | Germany | July 8, 1954 |